United States Patent
Chen

(10) Patent No.: US 9,273,576 B2
(45) Date of Patent: Mar. 1, 2016

(54) METHOD FOR REDUCING UREA DEPOSITS IN AN AFTERTREATMENT SYSTEM

(75) Inventor: Kevin Chen, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 364 days.

(21) Appl. No.: 12/858,196

(22) Filed: Aug. 17, 2010

(65) Prior Publication Data

US 2011/0167805 A1    Jul. 14, 2011

(51) Int. Cl.
*F01N 3/00*   (2006.01)
*F01N 3/035*  (2006.01)
*F01N 3/023*  (2006.01)
*F01N 3/20*   (2006.01)

(52) U.S. Cl.
CPC ............... *F01N 3/035* (2013.01); *F01N 3/023* (2013.01); *F01N 3/208* (2013.01); *F01N 3/2073* (2013.01); *F01N 2610/02* (2013.01); *F01N 2610/146* (2013.01); *F01N 2900/0411* (2013.01); *F01N 2900/1606* (2013.01); *Y02T 10/24* (2013.01)

(58) Field of Classification Search
CPC ......... F01N 3/023; F01N 3/035; F01N 3/208; F01N 2610/02; F01N 2610/146; F01N 2900/0411; F01N 2900/1606; F01N 3/2073
USPC ............................. 60/274, 286, 297, 301, 311
See application file for complete search history.

(56) References Cited

U.S. PATENT DOCUMENTS

| | | | |
|---|---|---|---|
| 7,434,551 B2 * | 10/2008 | Zajac et al. .................. 123/70 R |
| 7,478,527 B2 * | 1/2009 | Wills ............................. 60/295 |
| 2001/0023586 A1 * | 9/2001 | Hammerle et al. ............. 60/286 |
| 2007/0056274 A1 | 3/2007 | Wills |
| 2007/0144151 A1 | 6/2007 | Lueders et al. |
| 2007/0144152 A1 | 6/2007 | Lueders |
| 2008/0271440 A1 * | 11/2008 | Xu et al. ......................... 60/295 |
| 2008/0295482 A1 | 12/2008 | Gonze et al. |
| 2009/0107118 A1 | 4/2009 | Ruona |
| 2009/0120068 A1 * | 5/2009 | Sakimoto et al. ............... 60/285 |
| 2009/0126349 A1 | 5/2009 | Shimomura et al. |
| 2009/0165442 A1 | 7/2009 | Hara |
| 2010/0242447 A1 * | 9/2010 | Jasinkiewicz .................. 60/286 |
| 2011/0023462 A1 | 2/2011 | Kurtz et al. |

OTHER PUBLICATIONS

Partial Translation of Office Action of Chinese Application No. 201110224358.9, Issued Nov. 26, 2014, State Intellectual Property Office of PRC, 8 Pages.
Anonymous, "Increase Overall Life Long SCR Performan," IPCOM No. 000192807, Published Feb. 3, 2010, 5 pages.

* cited by examiner

*Primary Examiner* — Thomas Denion
*Assistant Examiner* — Matthew T Largi
(74) *Attorney, Agent, or Firm* — Julia Voutyras; Alleman Hall McCoy Russell & Tuttle LLP

(57) ABSTRACT

Various systems and methods are described for controlling a diesel aftertreatment system coupled to an exhaust system of an engine which includes a selective catalytic reduction (SCR) catalyst and a diesel particulate filter (PF). In one example, a threshold amount of urea injected to the SCR catalyst is adjusted based on an amount of soot generated by the engine and the total amount of urea injected to the SCR catalyst is limited by the threshold.

19 Claims, 6 Drawing Sheets

US 9,273,576 B2

METHOD FOR REDUCING UREA DEPOSITS IN AN AFTERTREATMENT SYSTEM

TECHNICAL FIELD

The present application relates to reducing an accumulated amount of urea deposited in an aftertreatment system

BACKGROUND AND SUMMARY

Diesel vehicles are equipped with an aftertreatment system which may include, for example, one or more of each of a selective catalytic reduction (SCR) system and a diesel particulate filter in order to reduce emissions. Such an aftertreatment system may utilize the injection of a reductant such as urea to facilitate the reduction of $NO_x$, for example. An injection amount of urea that is too low may result in a $NO_x$ conversion efficiency that is too low to meet regulation standards. On the other hand, an injection amount of urea that is too high may result in urea deposits in the system which may also decrease $NO_x$ efficiency and increase urea slip, as well as generate increased white smoke in the exhaust at high temperatures when the deposit is decomposed and released. Further, injection of too much urea may increase urea consumption thereby reducing urea economy.

The inventors herein have recognized the above issues and have devised an approach to at least partially address them. Thus, a method for an aftertreatment system of an engine exhaust, the aftertreatment system including a SCR catalyst and a particulate filter (PF), is disclosed. The method comprises, during decreased soot production, decreasing a total amount of urea injected to the SCR catalyst between a first and second regeneration and, during increased soot production, increasing the total amount of urea injected to the SCR catalyst between the first and second regeneration.

In one example the amount of urea injection is limited below a threshold, the threshold based on engine soot generation in addition to parameters such as exhaust temperatures, exhaust flow rates, and NO emission from the engine. For example, a urea deposit removal rate may be related to that of a burn rate of soot in a PF; thus, it may be beneficial to adjust urea injection to generate a urea deposit formation rate that is related to (e.g., less than) a soot deposit rate in order for a PF regeneration to substantially remove accumulated urea deposits. In other words, as PF regenerations may be triggered by soot storage levels (which in turn are driven by soot deposit rates and thus soot generation rates), if the urea deposit rate is controlled (through limiting urea injection levels) based on the soot levels, the PF regenerations triggered based on soot will be often enough to remove any urea deposits.

As such, during decreased soot production when the average engine out soot amount per unit time is decreased, the amount of urea injected to the SCR catalyst may limited to a reduced level, and the total amount of urea injected during decreased soot production is less than that during an interval of increased soot production when the average engine out soot amount per unit time is increased. In this way, an amount of urea injected to the SCR catalyst may be controlled such that urea economy and/or $NO_x$ conversion efficiency may be increased and accumulated soot deposits in the SCR catalyst may be reduced resulting in a reduced amount of white smoke in the exhaust, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
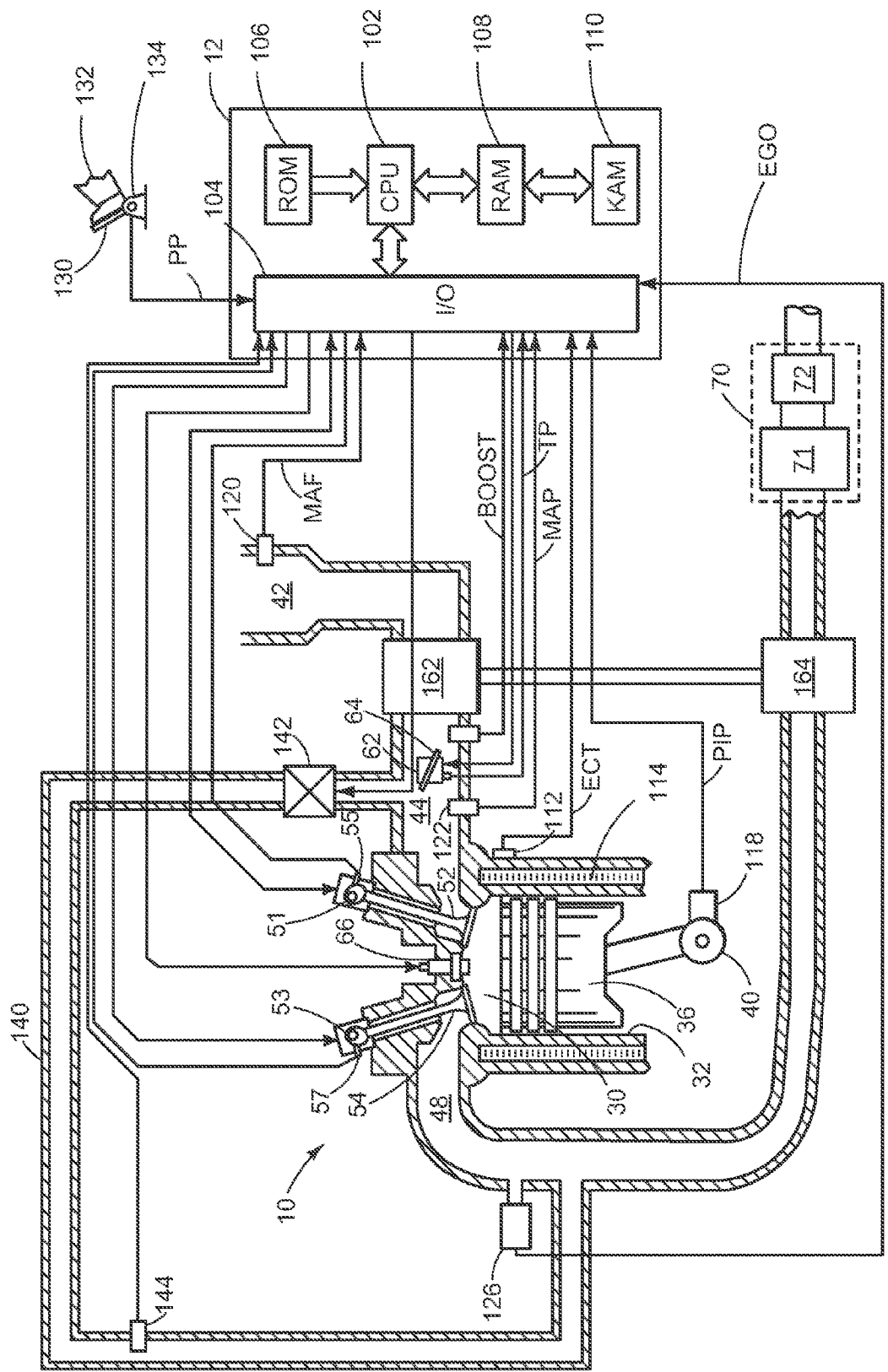
FIG. 1 shows a schematic diagram of an engine including an aftertreatment system.
Figure 2:
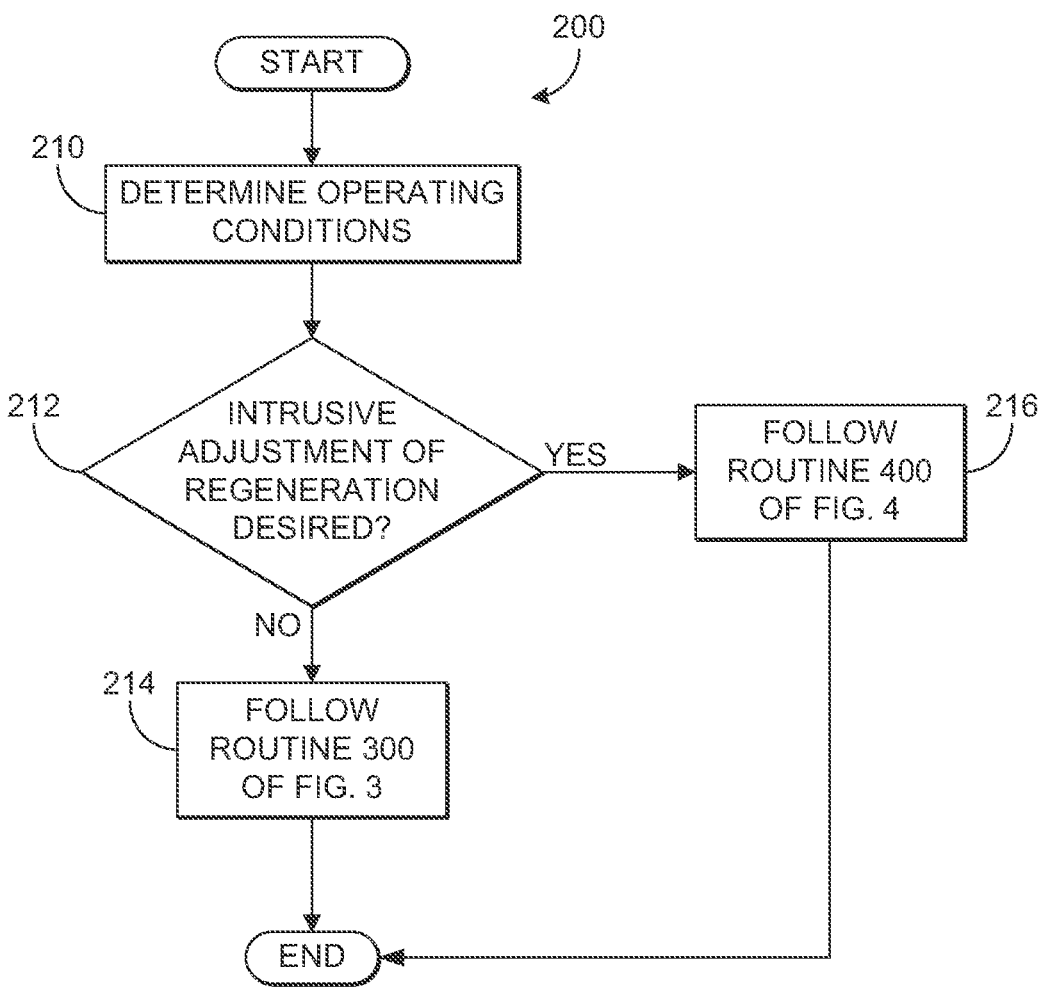
FIG. 2 shows a high level flow chart illustrating a routine for determining a regeneration mode of an aftertreatment system.
Figure 3:
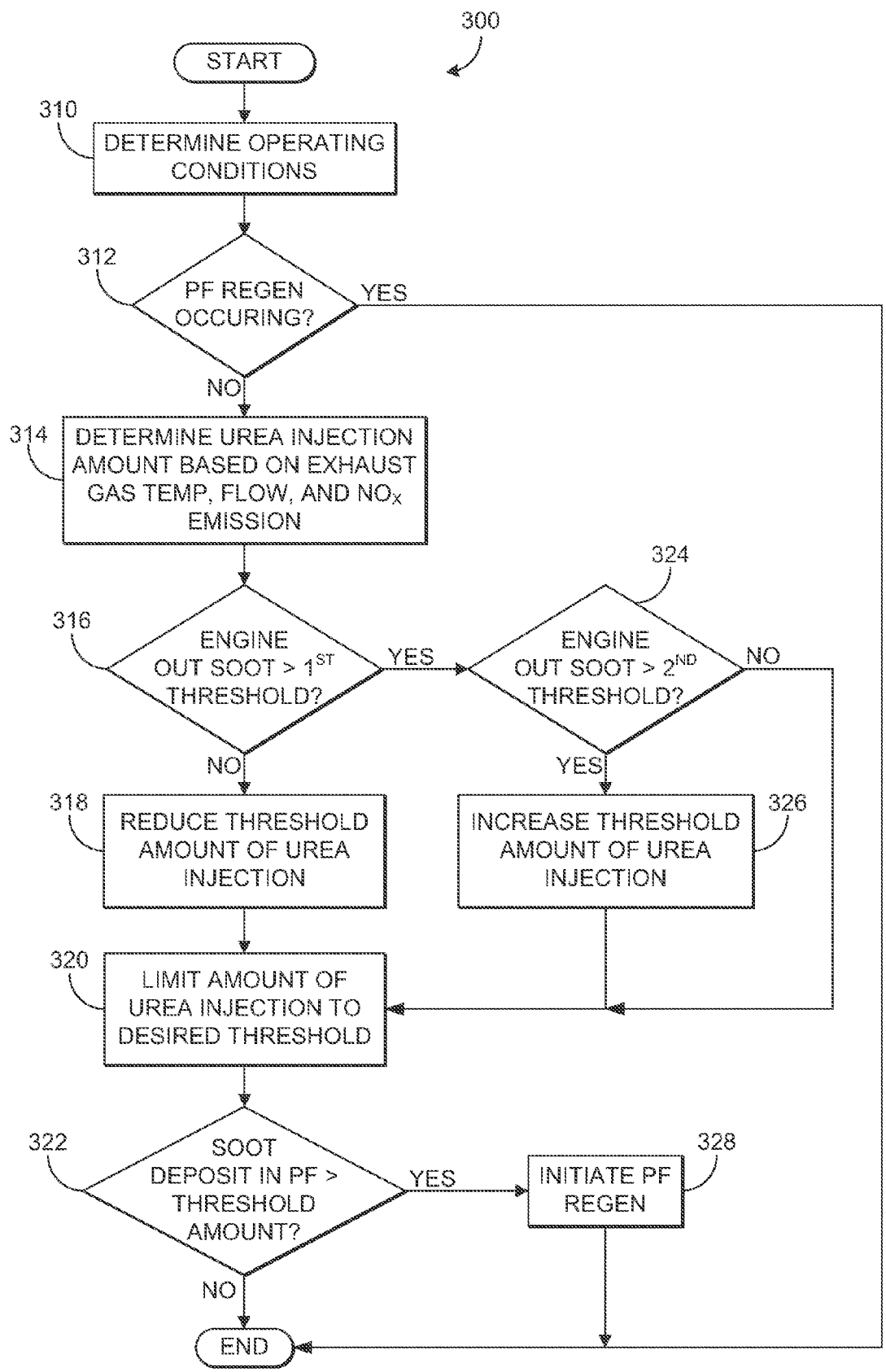
FIG. 3 shows a flow chart illustrating a routine for a first regeneration for an aftertreatment system.
Figure 4:
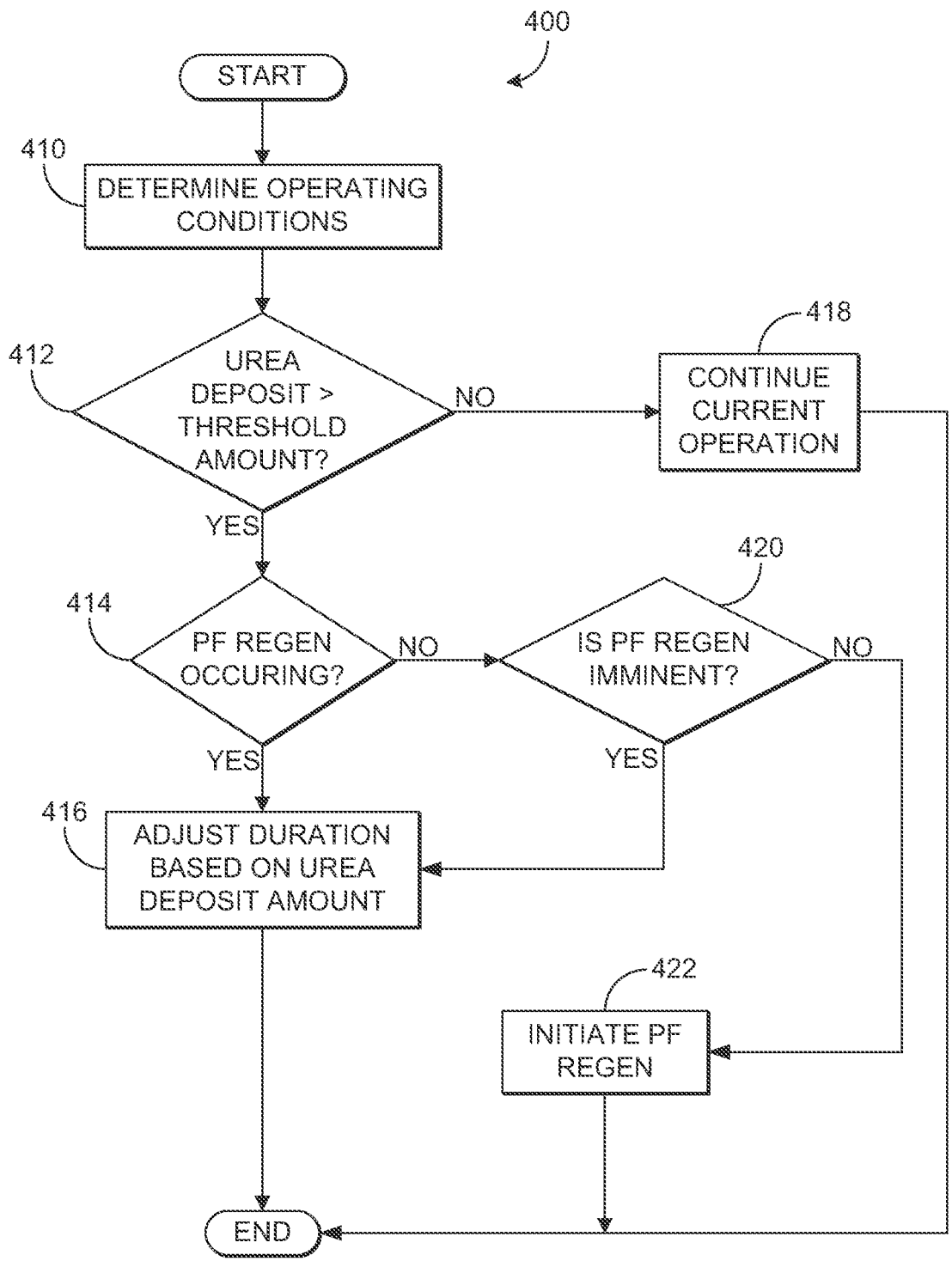
FIG. 4 shows a flow chart illustrating a routine for a second regeneration mode for an aftertreatment system.
Figure 5:
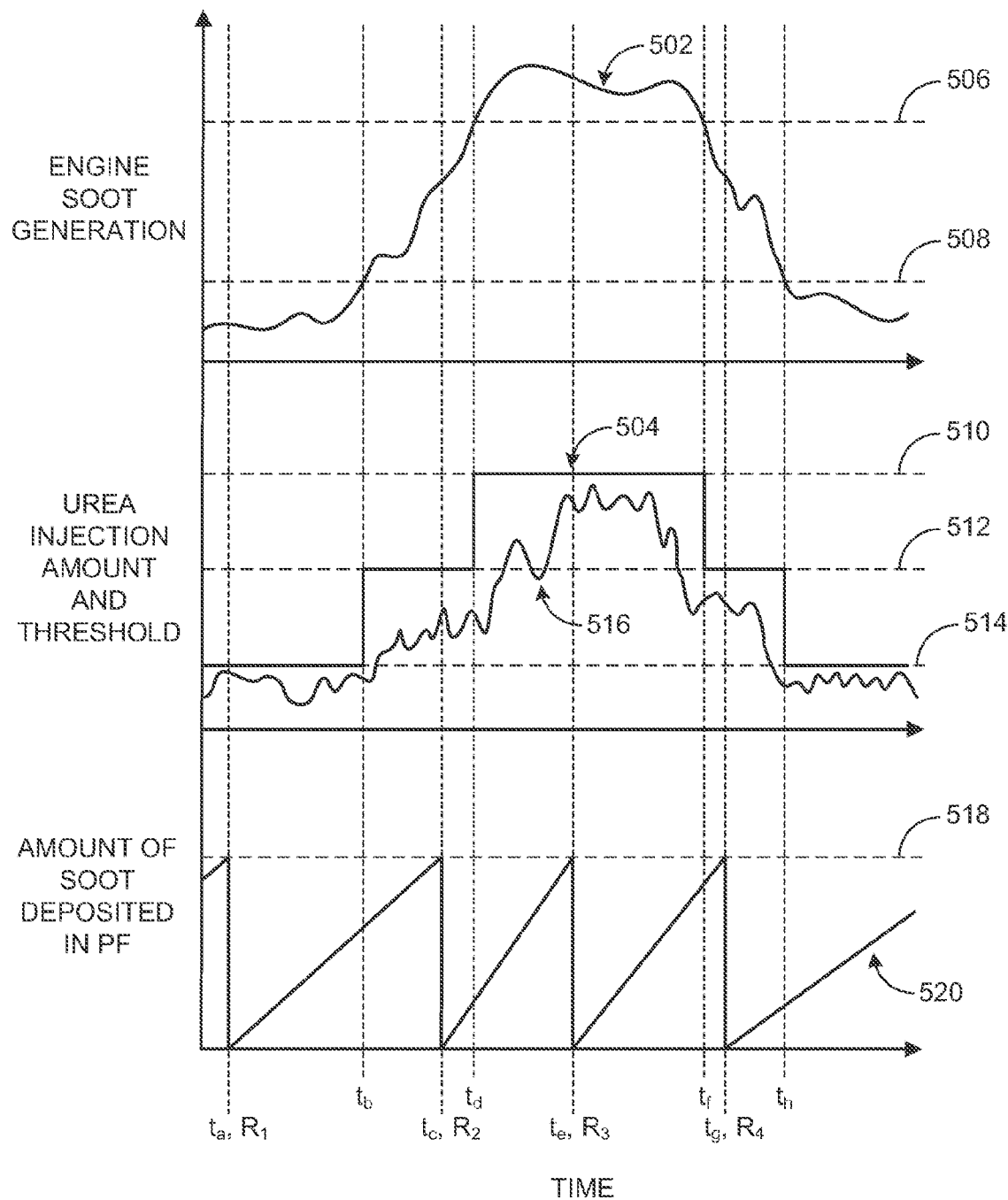
FIG. 5 shows a series of graphs illustrating engine soot generation, amount of soot deposited in a particulate filter, and urea injection amount and threshold with respect to time for a first regeneration mode of an aftertreatment system.
Figure 6:
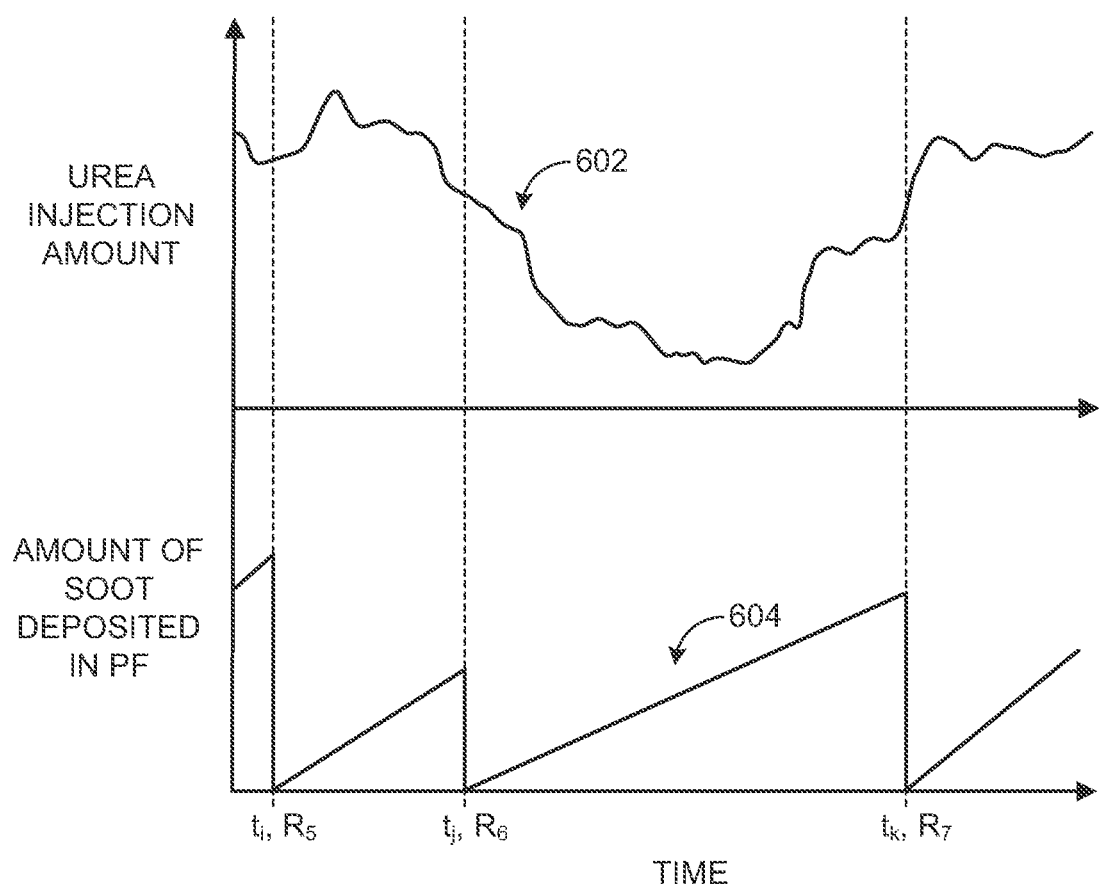
FIG. 6 shows a series of graphs illustrating urea injection amount and amount of soot deposited in a particulate filer with respect to time for a second regeneration mode of an aftertreatment system.

The following description relates to a method for controlling an aftertreatment system which includes a urea injection system, a selective catalytic reduction (SCR) catalyst and a particulate filter (PF), and particularly relates to addressing issues of urea deposit. Depending on operating parameters such as exhaust temperature, some of the urea may be deposited on the SCR catalyst instead of being decomposed and absorbed (e.g., stored) by the catalyst for $NO_x$ reduction. In a first regeneration mode, when an accumulated amount of urea deposit is less than a threshold amount, for example, a threshold amount of urea injected to the SCR is adjusted (e.g., limited to a lower level) based, in part, on an amount of soot generated by the engine. In a second regeneration mode, when the accumulated amount of urea deposit is greater than the threshold amount, for example, the threshold amount of urea injected to the SCR is adjusted (e.g., limited to a higher level) again based, in part, on an amount of soot generated by the engine. Further, in the second regeneration mode, duration and/or timing of a PF regeneration may be adjusted based on an estimated amount of accumulated soot deposit, for example. As such, urea deposits in the SCR catalyst may be controlled and urea economy and NO conversion efficiency may be increased. FIG. 1 shows an example of an engine including an aftertreatment system, FIG. 2 shows a flow chart for determining a mode of operation of the aftertreatment system, FIGS. 3 and 4 show flow charts depicting routines for controlling urea deposits in an SCR catalyst in the first and second modes, respectively, and FIGS. 5 and 6 show examples of urea injection amount and soot deposit amount over time.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein. Fuel injection may be via a common rail system, or other such diesel fuel injection system. Fuel may be delivered to fuel injector 66 by a high pressure fuel system (not shown) including a fuel tank, a fuel pump, and a fuel rail.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more pressure, temperature, and concentration of the exhaust gas. Alternatively, the EGR may be controlled through a calculated value based on signals from the MAF sensor (upstream), MAP (intake manifold), IAT (intake manifold gas temperature) and the crank speed sensor. Further, the EGR may be controlled based on an exhaust O2 sensor and/or an intake oxygen sensor (intake manifold)]. Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control system 70 is shown arranged along exhaust passage 48 downstream of exhaust gas sensor 126. System 70 may be a selective catalytic reduction (SCR) system, a three way catalyst (TWC), $NO_x$ trap, various other emission control devices, or combinations thereof. For example, device 70 may be a diesel aftertreatment system which includes an SCR catalyst 71 and a particulate filter (PF) 72. In some embodiments, PF 72 may be located downstream of the catalyst (as shown in FIG. 1), while in other embodiments, PF 72 may be positioned upstream of the catalyst (not shown in FIG. 1). As will be described in more detail below, the PF may be thermally regenerated periodically during engine operation. Further, in some embodiments, during operation of engine 10, emission control system 70 may be periodically reset by operating at least one cylinder of the engine within a particular air/fuel ratio.

In one example, a urea injection system may be provided to inject liquid urea to SCR catalyst 71. However, various alternative approaches may be used, such as solid urea pellets that generate an ammonia vapor, which is then injected or metered to SCR catalyst 71. In still another example, a lean $NO_x$ trap may be positioned upstream of SCR catalyst 71 to generate ammonia for the SCR catalyst, depending on the degree or richness of the air-fuel ratio fed to the Lean NOx trap.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Continuing to FIG. 2, it shows a high level flow chart illustrating a routine 200 for determining which mode of PF regeneration should be used. Specifically, routine 200 determines if intrusive regeneration is desired based on operating parameters such as soot generation by the engine and desired urea injection amount.

At 210 of routine 200, operating conditions are determined. Operating conditions may include amount of $NO_x$ generated by the engine, degradation level of the particulate filter, accumulated amount of urea deposit in the SCR catalyst, etc.

Once the operating conditions are determined, routine 200 proceeds to 212 where it is determined if an intrusive adjustment of regeneration is desired. Herein, intrusive adjustment implies the PF is regenerated more frequently than required to remove soot deposits from the PF.

In one example, intrusive injection may be desired when there is a need to inject more urea than an amount currently limited by an allowable threshold. The allowed level may be set based on soot production and soot regeneration triggered based on soot storage, or pressure drop, of the PF. As such, under conditions where the urea injection is limited to the allowed level, PF filter regenerations triggered based on soot loadings, for example, will be sufficient to remove urea deposits in the SCR catalyst (in that increased exhaust heat from PF regeneration sufficiently raises the SCR catalyst to a condition to remove urea deposits). However, if the desired urea injection for $NO_x$ control is requested to be above the allowed level for a sufficient duration, then continued limiting of urea injection may affect $NO_x$ emissions. As such, an intrusive PF regeneration may be requested at 212, to thereby enable the allowed urea injection level to be raised, at least temporarily. This additional, intrusive PF regeneration, in addition to PF regenerations scheduled based on soot storage levels, for example, thus enables addition urea deposit removal, enabling an increase in the allowed urea injection. Such conditions may occur including when soot generation may be low resulting in an otherwise reduced urea injection threshold, but $NO_x$ generation may be high and a greater amount of urea injection is desired. In still another example, intrusive injection may be desired when soot generation is low for an extended period of time and a greater amount of urea injection is desired based on conditions such as exhaust temperature, exhaust flow rate, and/or $NO_x$ generation by the engine.

As another example, if a degradation level of the PF is relatively high, intrusive adjustment of regeneration may not be desired as further degradation may occur if the PF is heated to regeneration temperatures (e.g., greater than 600° C.) for extended periods and the soot level is relatively low. In this case, therefore, intrusive regeneration may be disabled (no at 212).

As yet another example, if the amount of accumulated urea deposit (described in greater detail below) in the SCR catalyst is greater than the amount of soot deposited in the PF (described in greater detail below), intrusive adjustment of regeneration may be desired to remove the urea deposit (yes at 212). Thus, the frequency of regeneration may be based on an amount of accumulated urea deposit in the SCR catalyst. For example, when $NO_x$ generation by the engine is high, an amount of urea injected to the SCR catalyst may be relatively high, thus increasing urea deposits.

If it is determined that intrusive adjustment is not desired, routine 200 continues to 214 and routine 300 of FIG. 3 is carried out, as described below. In contrast, if it is determined that intrusive adjustment of regeneration is desired, routine 200 moves to 216 and routine 400 of FIG. 4 is carried out, as described below.

FIG. 3 shows a flow chart illustrating a control routine 300 for a first mode of operation of an aftertreatment system (e.g., non-intrusive regeneration mode), such as aftertreatment system 70 depicted in FIG. 1. Specifically, routine 300 determines an amount of soot generated by the engine and adjusts the urea injection threshold accordingly. As such, an accumulated amount of urea deposit may be reduced, for example.

At 310 of routine 300, operating conditions are determined. Operating conditions may include exhaust temperature, pressure difference across the catalyst, exhaust flow rate, $NO_x$ generation, and engine soot generation, for example.

Once the operating conditions are determined, routine 300 proceeds to 312 where it is determined if PF regeneration is occurring. In some examples it may be determined that regeneration of the PF is occurring if temperature sensors indicate temperatures of the exhaust, SCR, and/or PF are above threshold temperatures, for example. If it is determined that regeneration is occurring, in some examples, the routine ends. In other examples, the routine may move to another routine which monitors the accumulation of urea deposit, such as routine 400 of FIG. 4. In such an example, the duration of the regeneration being carried out may be adjusted based on the urea deposit in addition to an amount of soot deposit, for example.

On the other hand, if it is determined that PF generation is not occurring, routine 300 continues to 314 where the urea injection amount is determined based on exhaust gas temperature, exhaust gas flow, and $NO_x$ emission from the engine. For example, when measurements from one or more $NO_x$ sensors in the exhaust indicate there is a relatively high level of $NO_x$ in the exhaust, a greater amount of urea may be injected in order to reduce the $NO_x$. As another example, during periods when the exhaust temperature is low, less urea may be injected to the SCR catalyst as the urea may not fully decompose at lower temperatures (e.g., less than 300° C.) and there is a greater chance for urea deposits to form. A threshold amount of urea that may be injected during such time may be a set amount, such as indicated by the dashed line at 512 in FIG. 5. In other examples, the threshold amount of urea that may be injected may vary with various operating parameters such as exhaust temperature.

Once the urea injection amount is determined, routine 300 of FIG. 3 proceeds to 316 where it is determined if engine out soot (e.g., the amount of soot generated by the engine per unit time or per engine rotation) is greater than a first threshold amount. The amount of engine out soot may be determined based on output from an engine speed sensor and an amount of fuel supplied to the engine, for example. The first threshold amount may be a relatively small amount of soot generation. For example, the first threshold may correspond to a relatively low engine speed and small amount of fuel supplied to the engine. Dashed line 508 in FIG. 5 shows an example of a first engine soot generation threshold.

If it is determined that the amount of engine out soot is less than the first threshold, routine 300 continues to 318 where the threshold amount of urea injection is reduced. For example, in some embodiments, the urea deposit removal rate may be similar to the average burn rate of soot in the PF during a regeneration. As such, the threshold amount of urea injected may correspond to a urea deposit formation rate that is no faster than a soot deposit rate. Thus, when the engine soot generation amount decreases below the first threshold amount, the urea injection threshold amount is decreased to reduce the accumulation of urea deposit.

Once the threshold amount of urea that may be injected to the SCR catalyst is reduced, routine 300 proceeds to 320 where the amount of urea injection is limited to the threshold amount. In this manner, the amount urea injected to the SCR catalyst may not exceed an amount which results in a greater accumulation of soot deposit than can be removed via regeneration of the PF.

As an example, as shown in FIG. 5, when the instantaneous amount of soot generated by the engine 502 drops below the first threshold amount (indicated by dashed line 508) at times before $t_b$ and after $t_h$, the threshold amount of urea 504 that may be injected to the SCR catalyst decreases as indicated by dashed line 514. Further, as illustrated by curve 516, the amount of urea injected to the SCR catalyst is limited to the threshold amount and as such does not increase above the threshold amount. Thus, urea injection is based not only on parameters as described above (exhaust temperature, $NO_x$ emissions, etc.), but it is also based on the amount of soot generated by the engine. In this way, the amount of urea injected to the SCR catalyst is limited by threshold amount that is controlled such that it corresponds to engine soot generation and urea deposits that may form may be removed during a subsequent PF regeneration that may occur based on an amount of soot in the PF, for example.

Continuing with FIG. 3, if, instead, it is determined that the amount of the engine out soot is greater than the first threshold, routine 300 moves to 324 where it determined if the engine out soot is greater than a second threshold amount. The second threshold amount may be a relatively large amount of soot generation. For example, the second threshold may correspond to a relatively high engine speed and large amount of fuel supplied to the engine. Dashed line 506 in FIG. 5 shows an example of a first engine soot generation threshold.

If it is determined that the engine out soot is less than the second threshold amount, routine 300 moves to 320 and the amount of urea injection is based on exhaust gas temperature, exhaust flow, and $NO_x$ emission from the engine determined at 314, as described above. For example, between times $t_b$ and $t_d$ shown in FIG. 5, the engine soot generation 502 increases above the first threshold 508 but is less than the second threshold 506. As such, the threshold amount of urea injection 504 returns to the threshold indicated by dashed line 512 and the amount of urea injected increases, but not more than the threshold amount.

On the other hand, if it is determined that the engine out soot is greater than the second threshold amount, routine 300 of FIG. 3 continues to 326 where the threshold amount of urea injection is increased. For example, as described above, the urea deposit removal rate may be similar to the average burn rate of soot in the PF during a regeneration. As such, when the amount of soot generated by the engine increases, the amount of urea injected to the engine may also increase. In this way, $NO_x$ conversion efficiency may be increased, for example.

As an example, FIG. 5 shows the amount of engine soot generation 502 increasing above the second threshold amount 506 at time $t_d$ and decreasing below the threshold at time $t_f$. During this period of time, the urea injection threshold amount 504 increases to the threshold indicated by the dashed line 510. In this way, the threshold amount of urea injected to the SCR catalyst is controlled such that it corresponds to engine soot generation and urea deposits that may form may be removed during a subsequent PF regeneration that may occur based on an amount of soot in the PF, for example, while $NO_x$ conversion efficiency may be increased due to a higher limit of urea that may be injected.

Once the amount of urea injected to the SCR catalyst is limited to the desired threshold at 320, routine 300 of FIG. 3 proceeds to 322 where is it determined if the amount of soot deposited in the particulate filter is greater than a threshold amount. If it is determined that the amount of soot is greater than the threshold amount, routine 300 moves to 328 and regeneration of the particulate filter is initiated. On the other hand, if it is determined that the amount of soot deposited in the particulate filter is less than the threshold amount, the routine ends.

FIG. 5 shows times at which various regenerations occur. As shown by curve 520, PF regeneration occurs when the amount of soot in the particulate filter reaches a threshold amount 520. For example, at time $t_a$, a first regeneration $R_1$ occurs, a second regeneration $R_2$ occurs at time $t_c$, a third regeneration $R_3$ occurs at time $t_e$, and a fourth regeneration $R_4$ occurs at time $t_g$. Due to a lower amount of soot produced by the engine and a decreased average engine out soot per unit time, the length of time between regenerations $R_1$ and $R_2$ is greater than the length of time between regenerations $R_2$ and $R_3$ and the length of time between regenerations $R_3$ and $R_4$, for example. Although the duration between subsequent regenerations $R_1$ and $R_2$ is greater than that between $R_2$ and $R_3$, for example, the total amount of urea injected to the SCR catalyst during the time between $R_1$ and $R_2$ may be lower than that during the time between $R_2$ and $R_3$ as a result of the decreased limit for urea injection due to the low engine soot generation. Although FIG. 5 shows regeneration occurring at the same threshold amount of soot deposited in the particulate filter, in other examples, regeneration may occur when pressure drop across the particulate filter reaches a threshold, for example.

Thus, the threshold amount of urea injected to the SCR catalyst may be adjusted based on the amount of soot generated by the engine. During periods when soot generation is low (e.g., below the first threshold value), the urea injection threshold may be decreased such that urea deposits may be reduced thereby reducing an amount of white smoke in the exhaust. During periods when soot generation is high (e.g., above the second threshold value), the urea injection threshold may be increased such that more urea may be injected to the SCR catalyst and $NO_x$ conversion efficiency may be increased. Further, during the first regeneration mode, each regeneration of the particulate filter occurs when the same threshold amount of soot deposited in the filter is reached.

FIG. 4 shows a flow chart illustrating a control routine 400 for a second mode of operation of the aftertreatment system (e.g., an intrusive regeneration mode), such as aftertreatment system 70 depicted in FIG. 1. Specifically routine 400 determines an amount of accumulated urea deposit and adjusts regeneration of the PF accordingly. Thus, regeneration may be adjusted to be carried out such that an accumulated amount of urea deposit may be reduced, and as such, the amount of urea may not be limited to by a threshold, for example.

At 410 of routine 400, operating conditions are determined. Operating conditions may include exhaust temperature, pressure difference across the catalyst, exhaust flow rate, $NO_x$ generation, soot generation, etc.

Once the operating conditions are determined, routine 400 continues to 412 where it is determined if the urea deposit amount is greater than a threshold amount. In some examples, the threshold amount of accumulated urea deposit may be a level at which the SCR catalyst can no longer achieve a desired $NO_x$ conversion efficiency. For example, NOx sensors positioned upstream and downstream of the SCR catalyst may be used to estimate the $NO_x$ conversion efficiency. In other examples, the amount of accumulated urea deposit may be estimated based on a pressure difference across the SCR catalyst as measured by one or more pressure sensors positioned along the SCR catalyst, for example.

If it is determined that the urea deposit is less than the threshold amount, routine 400 moves to 418 and current operation is continued without adjusting regeneration parameters based on accumulated urea deposits in the SCR catalyst. If, instead, it is determined that the amount of urea deposit is greater than the threshold amount, routine 400 proceeds to 414 where it is determined if PF regeneration is occurring. As described above, PF regeneration may be occurring when one or more temperature sensors indicate the temperatures of the SCR catalyst, PF, and/or exhaust are greater than respective threshold temperatures (e.g., 600° C. for the PF), for example.

If it is determined that PF regeneration is occurring, routine 400 continues to 416 and the duration of the regeneration is adjusted based on amount of urea deposited. For example, in some embodiments, the duration of the regeneration may be extended based on the amount of accumulated urea deposit above the threshold amount. In other embodiments, the exhaust temperature may be decreased such that the PF temperature is decreased to avoid degradation of the PF once the accumulated soot is removed but maintained high enough that urea deposits may still be removed from the SCR catalyst, for example.

If it is determined that PF regeneration is not occurring, however, routine 400 moves to 420 where it is determined if PF regeneration is imminent. It may be determined that regeneration is imminent based on an amount of particulate stored in the filter, a pressure drop across the filter nearing a threshold value, etc. For example, a build up of soot in the particulate filter may impede the ability of the PF to further remove soot from the exhaust and increase a back pressure over the PF; thus, regeneration may in imminent when the pressure drop across the filter approaches a threshold value indicating the filter needs to be cleaned.

If it is determined that PF regeneration is not imminent, routine 400 moves to 422 and PF regeneration is initiated. In some embodiments, regeneration may be initiated by increasing the temperature of the PF via a heater. In other embodiments, the temperature of the exhaust gas may be increased in order to raise the temperature of the PF.

On the other hand, if it is determined that PF regeneration is imminent, routine 400 moves to 416 and the duration of the regeneration is adjusted based on the accumulated urea deposit amount, as described above.

FIG. 6 shows an example of urea injection amount 602 and amount of soot deposited in the particulate filter 604 over time during the second regeneration mode. In this example, regeneration occurs at varying amounts of deposited soot and occurs based on urea injection (e.g., intrusive regeneration). For example, at time $t_i$ regeneration $R_5$ occurs, at time $t_j$, regeneration $R_6$ occurs, and at time $t_k$ regeneration $R_7$ occurs. The length of time between $R_5$ and $R_6$ is greater than the length of time between $R_6$ and $R_7$ due to a decrease in urea injection to the SCR catalyst between $R_6$ and $R_7$. Thus, the frequency of regeneration increases with increased urea injection (and thus an increased urea deposit accumulation) to the SCR catalyst.

In this way, urea deposits in the SCR catalyst may be controlled. For example, when the accumulated amount of urea deposit is less than the threshold value, the threshold amount of urea injected to the SCR catalyst may be adjusted based on the amount of soot generated by the engine thereby reducing urea deposits and increasing $NO_x$ conversion efficiency. When the accumulated amount of urea deposit is greater than the threshold value, regeneration parameters may be adjusted such that the excess amount of urea deposit is removed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine exhaust aftertreatment system, comprising:
   in response to an accumulated amount of urea deposit in a selective catalytic reduction (SCR) catalyst being less than a threshold, injecting a decreased total amount of urea to the SCR catalyst between a first and second particulate filter (PF) regeneration during decreased soot production and injecting an increased total amount of urea to the SCR catalyst between the first and second PF regeneration during increased soot production; and
   in response to the accumulated amount of urea deposit in the SCR catalyst being greater than the threshold, adjusting regeneration of a PF based on the accumulated amount of urea deposit in the SCR catalyst to temporarily enable increased urea injection.

2. The method of claim 1, wherein soot production is estimated based on engine speed and amount of fuel supplied to the engine, and wherein decreased soot production includes a decreased average engine out soot amount per unit time between the first and second PF regeneration, and increased soot production includes an increased average engine out soot amount per unit time between the first and second PF regeneration, and the first and second PF regenerations are based on a stored soot amount reaching a threshold level.

3. The method of claim 1, wherein decreased soot production includes engine soot generation per unit time below a first threshold amount, wherein the adjusting of PF regeneration in response to the accumulated amount of urea deposit in the SCR catalyst being greater than the threshold includes an intrusive PF regeneration, in addition to PF regenerations scheduled based on soot storage levels.

4. The method of claim 3, further comprising, when the engine soot generation is below the first threshold amount, reducing a threshold amount of urea injection and limiting urea injection to the reduced threshold.

5. The method of claim 3, further comprising in response to degradation of the PF, disabling the intrusive PF regeneration, and wherein increased soot production includes engine soot generation per unit time above a second threshold amount.

6. The method of claim 5, further comprising, when the engine soot generation is above the second threshold amount, increasing a threshold amount of urea injection and limiting urea injection to the increased threshold.

7. The method of claim 1, wherein an amount of urea injection is further based on exhaust temperature, exhaust flow rate, and $NO_x$ emission from the engine.

8. The method of claim 1, wherein a duration between the first and second PF regeneration is longer during decreased soot production than during increased soot production.

9. The method of claim 1, wherein a decreased soot condition includes engine soot generation below a first threshold amount, and wherein an increased soot condition includes engine soot generation above a second threshold amount which is greater than the first threshold amount, and where the second PF regeneration and first PF regeneration are based on a same condition of the PF.

10. The method of claim 9, where engine soot generation is estimated based on engine speed and an amount of fuel supplied to the engine.

11. The method of claim 9, wherein the total amount of urea injection to the SCR catalyst is greater during the increased soot condition than during the decreased soot condition.

12. The method of claim 9, wherein a duration between the first and second PF regeneration is longer during the decreased soot condition and shorter during the increased soot condition, and where the second PF regeneration and first PF regeneration are based on a same condition of the PF including an amount of soot stored in the PF reaching a soot threshold.

13. The method of claim 12, further including a third PF regeneration, wherein the third PF regeneration is based on a different condition than the first PF regeneration and the second PF regeneration including the accumulated amount of urea deposit in the SCR catalyst, the third PF regeneration occurring before the amount of soot stored in the PF reaches the soot threshold.

14. A system for an aftertreatment device coupled to an exhaust system of an engine in a vehicle, the system comprising:
    a selective catalytic reduction (SCR) catalyst;
    a diesel particulate filter (PF);
    a control system comprising a computer readable storage medium, the medium including instructions for:
        in a first regeneration mode, between a first and second regeneration of the PF:
            during decreased soot production, reducing a threshold amount of total urea injection to the SCR catalyst between the first and second PF regeneration and limiting a total amount of urea injected to the reduced threshold between the first and second PF regeneration; and
            during increased soot production, increasing the threshold amount of total urea injection to the SCR catalyst between the first and second PF regeneration and limiting a total amount of urea injected to the increased threshold between the first and second PF regeneration, where during the first regeneration mode both first and second PF regenerations are based on a same threshold; and
        in a second regeneration mode responsive to a desired urea injection for NOx control requested to be above the reduced threshold for a duration, increasing the threshold amount of total urea injection and adjusting at least one of regeneration duration and timing of the PF based on an accumulated amount of urea deposit in the SCR catalyst to lengthen regeneration duration or decrease duration between regenerations.

15. The system of claim 14, wherein decreased soot production includes engine soot generation below a first threshold amount, and wherein increased soot production includes engine soot generation above a second threshold amount, and wherein a duration between the first and second PF regeneration is longer during decreased soot production than during increased soot production.

16. The system of claim 15, further comprising instructions for estimating soot production based on output from an engine speed sensor and an amount of fuel supplied to the engine.

17. The system of claim 14, wherein in the second regeneration mode, adjusting regeneration duration includes extending the duration of the regeneration when the accumulated amount of urea deposit in the SCR catalyst is greater than a threshold and regeneration is imminent.

18. The system of claim 14, wherein in the second regeneration mode, adjusting regeneration timing includes initiating regeneration when the accumulated amount of urea deposit in the SCR catalyst is greater than a threshold and regeneration is not imminent.

19. The system of claim 14, wherein the aftertreatment device is operated in the second regeneration mode when soot production becomes low and a greater amount of urea injection is desired.

* * * * *